3,166,430
IRON CERAMIC PIGMENT

Clarence A. Seabright, Lakewood, Ohio, assignor to The Harshaw Chemical Company, Cleveland, Ohio, a corporation of Ohio
No Drawing. Filed Feb. 27, 1964, Ser. No. 347,952
14 Claims. (Cl. 106—299)

This application is a continuation-in-part of copending application Serial No. 157,852, filed December 7, 1961, which is in turn a continuation-in-part of application Serial No. 110,223, filed May 15, 1961, which in turn is a continuation-in-part of application Serial No. 28,457, filed May 11, 1960, all now abandoned.

This invention relates to an iron-containing zircon pigment and more particularly to a coral colored ceramic pigment comprising zircon (zirconium silicate) having iron contained in the zircon crystal lattice.

The present invention is characterized as the calcination product of zirconium oxide, silicon oxide and iron oxide in the presence of fluoride ions. The properties of this product are such that it may be used uniquely as a coloring agent in glazes. The instant ceramic pigments or coloring agents are stable in most glazes imparting a pink to coral hue thereto.

Broadly, the compositions of the present invention comprise zircon having from about 0.25 percent to about 6 percent by weight of iron as iron oxide in the lattice. Essentially, the pigment composition contains from about 30 percent to about 80 percent by weight zirconium oxide, from about 15 percent to about 55 percent by weight silicon oxide and from about 0.25 percent to about 25 percent by weight of iron oxide, associated together to the extent of at least 40 percent of said oxides in the form of the iron-containing zircon crystal lattice.

The fact that the pigments of the present invention may be used as coloring agents in glazes is completely unexpected in view of the fact that compositions having identical component ingredients prepared in a different manner fail to act as coloring agents in glazes. Compositions prepared by calcining mixtures of zircon (zirconium silicate) and iron oxide in the presence of fluoride ions produce only the pale yellow or ivory color characteristic of iron oxide in glaze when the zircon-iron pigment is used in normal amounts (e.g., amounts used for coloring enamels and the like). If excessive amounts are used in a glaze, the glaze becomes a brownish red color completely devoid of pink which is also characteristic of iron oxide when used alone.

While the reasons for this marked difference are not completely understood, one possible explanation is that the iron oxide trapped in the lattice of the zirconium silicate can not be attacked by the glaze without attacking the zirconium silicate first. Once the zirconium silicate lattice is already formed, iron oxide or any other foreign element can not be placed in the lattice by calcination. Therefore, all the iron is vulnerable to attack by the glaze.

This theory seems to be borne out by the fact that iron oxide itself can not be used as a coloring agent for glazes to produce pink or coral hues and that iron-containing ceramic pigments comprising a host lattice or color fixing agent which is not as inert as zircon are not stable in glazes. Examples of such pigments include the reaction product of iron oxide and silica or its natural counterpart, Jap Ochre.

The zircon which is present as part of the pigments of the present invention is a zirconium silicate produced during the calcination and is of the same structure (as shown by X-ray diffraction) as the naturally occurring mineral zircon. Optimum proportions are approximately those of a product wherein all the zirconia and silica would be converted to zircon and with the maximum iron oxide contained in the zircon lattice. Less favorable proportions, however, can be used and can give good results, varying from the best to only fair. The zirconium dioxide (zirconia) and silicon dioxide (silica) react to form zircon, any excess of either remaining unreacted. The portion of the calcination product indicated by X-ray diffraction to have the zircon pattern is referred to herein as the reacted portion. A greater or lesser amount of iron oxide is held in the zircon crystal lattice depending upon the conditions of preparation. Usually the calcination product, even after grinding and washing, contains some iron oxide not fixed in the zircon crystal lattice and may show a characteristic X-ray diffraction pattern for iron oxide (iron in the zircon lattice does not show as iron oxide in an X-ray diffraction pattern).

Proportions of the component ingredients are easily chosen by those skilled in the art which will give a product 40 percent to 80 percent, or more, of reacted material (zircon) determined by the characteristic X-ray diffraction pattern for zircon. In addition to zircon having iron in its lattice, mixtures containing unreacted ingredients of the batch with the reacted materials may be used advantageously as ceramic colors or pigments.

In carrying out the process of this invention, it is important that there is a source of fluoride ions included in the calcination batch along with the source of zirconium oxide, silicon oxide and iron oxide. Moreover in its preferred form the precalcination mixtures of the present invention include a source of alkali metal ions. Preferably, the source of fluoride ion may be an alkali metal fluoride, or silicofluoride or an alkali metal fluoride plus a different halide such as alkali metal chloride or bromide. The iron compound may be dissolved in water and then mixed with the zirconia, silica, and halide and preferably alkali components to form a damp mass. The mass is calcined, powdered in a suitable manner, such as by ball milling, washed free of soluble salts and then dried. The calcination preferably is carried out in a closed sagger, or under equivalent conditions, which provides calcination of the batch substantially in contact with its own vapors and, incidentally, substantially out of contact with air. Calcination may be for a period of about one-half hour to about eight hours at temperatures in the range of 700° C. to 1300° C., the optimum calcination conditions being from 800° C. to 1100° C. for a period of about three to six hours.

The product resulting from the calcination contains at least 40 percent by weight and preferably at least 80 percent by weight of zircon (as determined by the X-ray diffraction data) based on the entire weight of the pigment product. X-ray analysis of raw calcination batches has shown that substantially no zircon was present. X-ray analysis of the pigment products produced by calcination of such batches has shown quantities of above 40 percent by weight, usually above 80 percent by weight of zircon to be present. While the strongly colored pigments containing in excess of 80 percent zircon are preferred, weaker pigments such as those pigments containing as little as 40 percent zircon have some value.

As mentioned above, the mineralizer compounds of this invention require at least fluoride ions and in some cases preferably also alkali metal ions and/or different halide ions. The halide ions may be derived from the compounds of zirconium or compounds of iron present in the calcination mixture, or the ions may be derived from compounds specially placed in the calcination mixture as a source of one or more ions. The mineralizer compounds should be present in the calcination mixture in amounts such that from about 0.25 percent to about 12 percent by weight of fluoride ions are present and preferably from about 0.25 percent to about 8.0 percent by weight of alkali metal ions are present, based on the combined weights of the silica, zirconia and ferric oxide in the calcined pigment. The preferred proportions of mineralizer compounds are such that about 0.25 percent by weight to about 8 percent by weight of alkali metal ions are present, from about 0.25 percent by weight to about 12 percent by weight of fluoride ions are present, and up to about 8.0 percent by weight of halide ions other than fluoride ions are present.

The silicon compound which may be silicon dioxide or a compound capable of yielding silicon dioxide is present in the calcination mixture in the range of from about 15 percent by weight to about 55 percent by weight, expressed as $SiO_2$ (preferably 24 percent to 45 percent), and, for example, may be silicon dioxide or silicic acid. The zirconium compound which may be zirconium dioxide or a compound capable of yielding zirconium oxide is present in the calcination mixture in the range of from about 30 percent by weight to about 80 percent by weight, expressed as zirconium dioxide (preferably 48 to 70 percent), and may be a compound such as, for instance, zirconium oxide, zirconium hydroxide, or zirconium carbonate. The iron compound capable of yielding ferric oxide ($Fe_2O_3$) is present in the calcination mixture in the range of from about 0.25 percent by weight to about 25 percent by weight of the calcination mixture expressed as ferric oxide ($Fe_2O_3$), preferably 3 percent to 15 percent and may be a compound such as, for instance, ferric chloride, ferrous sulfate, ferrous ammonium sulfate, ferric oxide, or ferric nitrate. As indicated hereinbefore the important aspect of the present invention is the iron being contained in the crystal lattice of the zircon. Broadly the invention includes pigments having as much iron contained in the zircon lattice as possible but amounts greater than about 6 percent do not appear possible. Moreover it is extremely difficult to obtain pigments having more than about 3 percent by weight in the lattice based on the weight of the zircon. In order to obtain pigments having optimum coloring properties at least 0.5 percent iron should be present in the lattice.

The source of alkali metal ions may be a compound such as, for instance, sodium chloride, sodium fluoride, sodium bromide, sodium carbonate, sodium silicofluoride, postassium chloride or lithium chloride. The source of fluoride ions may be a fluoride compound such as, for instance, sodium fluoride, potassium fluoride, cryolite, sodium silicofluoride, zirconium oxyfluoride, and the source of the halide ions other than fluoride ions may be a halogen compound such as, for instance, zirconium oxychloride, sodium chloride, sodium bromide, or potassium chloride. The halide ion other than fluoride ion is optional.

As a further refinement of the present invention the pigments are leached or treated with an acid. This treatment removes the unreacted iron oxide not trapped in the zircon lattice. Such treated pigments have been found to give improved colors which are cleaner and more pinkish in color than the untreated pigments. After treatment the pigments may have as much as 24 percent iron oxide removed and usually have about 6 percent to 10 percent iron oxide removed. However the treated pigments of the present invention always contain iron, at least 0.25 percent and preferably at least about 0.5 percent, thus indicating that the remaining iron is trapped or otherwise tied up by the zircon.

Moreover, the fact that the treated pigments, having only the minimal amounts of iron impart better color to ceramic glazes than the same pigment untreated, definitely indicates that functional portion of the iron oxide is trapped by the zircon. Other zircon pigments containing amounts of iron similar to the pigments of the present invention but prepared differently do not color a ceramic glaze a pinkish coral with or without treatment with an acid.

Examples of calcination batch mixtures for the preparation of the ceramic pigments of this invention are set forth in the following table, designated as Table I. The units for the component ingredients set forth in Table I are parts by weight.

TABLE I

| | A | B | C | D | E | F | G | H |
|---|---|---|---|---|---|---|---|---|
| Zirconium Dioxide | 63 | 63 | 63 | 63 | 63 | 63 | 63 | 63 |
| Silica | 31 | 31 | 31 | 31 | 31 | 31 | 31 | 31 |
| Ferric Oxide | | | | | | | 12 | 15 |
| Ferrous Sulfate | 8 | | | 8 | 8 | 15 | | |
| Ferric Chloride | | 6 | | | | | | |
| Ferrous Ammonium Sulfate | | | 11 | | | | | |
| Sodium Fluoride | 3 | 3 | 3 | 3 | 3 | 3 | | |
| Sodium Chloride | 4 | 4 | 4 | | | 4 | | |
| Sodium Bromide | | | | 4 | | | | |
| Potassium Chloride | | | | | 4 | | | |
| Sodium Silicofluoride | | | | | | | 14 | |
| Cryolite ($Na_3AlF_6$) | | | | | | | | 15 |

Specific examples of the preparation of the pigment of this invention are as follows:

Example I 8 grams of ferrous sulfate were dissolved in water and mixed with 4 grams of sodium chloride, 3 grams of sodium fluoride, 31 grams of silica, and 63 grams of zirconium oxide to form a damp mass. The damp mass was then calcined in a covered inert sagger at about 850° C. The calcine was then ground in a ball mill, washed free of soluble salts, and dried. The resulting product was a strong brown red ceramic pigment which yielded a desirable coral pink color in a glaze.

Example II 6 grams of ferric chloride were dissolved in water and mixed with 4 grams of potassium chloride, 3 grams of sodium fluoride, 31 grams of silica, and 63 grams of zirconium oxide to form a damp mass. The damp mass was then calcined in a covered inert sagger at about 850° C. The calcine was then ground in a ball mill, washed free of soluble salts, and dried. The resulting product was a strong brown red ceramic pigment which yielded a desirable coral pink color in a glaze.

Example III 10 grams of ferrous sulfate were dissolved in water and mixed with 4 grams of sodium chloride, 3 grams of sodium fluoride, 31 grams of silica and 63 grams of zircon-free zirconium oxide to form a damp mass. The damp mass was then calcined in a covered inert sagger at about 850° C. for a period of about one hour. The calcine was then ground in a ball mill, washed free of soluble salts and dried. The resulting product, which was found to contain about 50 percent of synthetic zircon, was a brown red ceramic pigment which yielded a coral pink color in a glaze.

Example IV 20 grams of ferrous sulfate were dissolved in water and mixed with 7.5 grams of sodium chloride, 6 grams of sodium fluoride, 31 grams of silica and 63 grams of zircon-free zirconium oxide to form a damp mass. The damp mass was then calcined in a covered inert sagger at about 850° C. for a period of about three hours. The calcine was then ground in a ball mill, washed free of soluble salts and dried. The resulting product, which was found to contain about 90 percent of synthetic zircon, was a strong brown red ceramic pigment which yielded a desirable coral pink color in the glaze.

Example V 63 grams of $ZrO_2$, 31 grams of $SiO_2$, 12 grams of $Fe_2O_3$ and 14 grams of sodium silicofluoride were intimately mixed. The mix was then calcined in a covered inert sagger at 1100° C. for three hours. The calcine was then ground in a ball mill, washed free of soluble salts and dried. The result was a violet brown ceramic pigment which yielded a coral pink color in glaze.

Example VI 1845 parts of Opax (91% zirconia; 7% silica; and the remainder alumina and titania), 855 parts of silica, 180 parts of iron oxide and 180 parts of barium fluoride were intimately mixed and calcined in a covered inert sagger at 1050° C. for six hours. The calcine was then mixed with 40 percent water and 0.50 percent barium hydrate, charged into a ball mill and ground for six hours. After drying, the material was passed through a hammermill. The pigment was brown red in color.

In accordance with the present invention, further examples, relating to the preparation of the pigments are set forth in the following Tables II and III.

Each of the pigments of Examples VII through XXI is mixed into a typical Cone 5 tile glaze, using 10 parts pigment to 100 parts glaze.

| Composition of Cone 5 tile glaze: | Parts by weight |
|---|---|
| Feldspar | 29 |
| Whiting (nat. $CaCO_3$) | 12 |
| Silica (−140 mesh) | 19 |
| Clay (Edgar plastic kaolin) | 15 |
| Barium carbonate ($BaCO_3$) | 6 |
| Lead bisilicate [$PbO \cdot (SiO_2)_2$] | 17 |
| Magnesium carbonate ($MgCO_3$) | 2 |

Each composition was then fired on ceramic tiles at about 1130° C. to give vitreous glaze coatings having varying shades of coral, ranging from a faint pink to a deep pinkish red hue.

TABLE II

| Constituents, Parts by Weight | VII | VIII | IX | X | XI | XII | XIII | XIV | XV | XVI | XVII | XVIII | XIX | XX | XXI |
|---|---|---|---|---|---|---|---|---|---|---|---|---|---|---|---|
| Zirconia ($ZrO_2$) | 56.8 | 54.2 | 54.2 | | | 12.8 | 13.2 | 13.5 | 13.9 | 14.3 | 50 | 51.3 | 52.6 | 54.0 | 55.5 |
| Opax (91% zirconia; 7% silica; and the remainder alumina and titania) | | | | 57.8 | 57.8 | 39.8 | 40.8 | 41.9 | 43.0 | 44.2 | | | | | |
| Silica ($SiO_2$) | 27.9 | 27.1 | 27.1 | 24.6 | 26.7 | 24.4 | 25.0 | 25.7 | 26.4 | 27.2 | 25 | 25.6 | 26.3 | 27.0 | 27.8 |
| Ferric Oxide (C. K. Williams R-1599) | | | | | | 12.8 | 10.5 | 8.1 | 5.6 | 2.9 | 12.5 | 10.3 | 7.9 | 5.4 | 2.8 |
| Ferric Oxide ($Fe_2O_3$, Mapico EG-3) | | 9.1 | | | | | | | | | | | | | |
| Ferric Oxide ($Fe_2O_3$, Mapico EG-80) | | | 9.2 | | | | | | | | | | | | |
| Ferric Oxide ($Fe_2O_3$, Mapico 297) | | | | 9.3 | 4.7 | | | | | | | | | | |
| Ferrous Sulphate ($FeSO_4 \cdot 7H_2O$) | 9.0 | | | | | | | | | | | | | | |
| Zircon ($ZrO_2 \cdot SiO_2$) | | 1.4 | 1.4 | | | | | | | | | | | | |
| Sodium Fluoride (NaF) | 2.7 | | | | | 3.8 | 3.9 | 4.1 | 4.2 | 4.3 | | | | | |
| Sodium Chloride (NaCl) | 3.6 | | | | | | | | | | | | | | |
| Cryolite ($Na_3AlF_6$) | | 8.1 | 8.1 | 5.3 | 3.8 | | | | | | | | | | |
| Sodium silicofluoride ($Na_2SiF_6$) | | | | 3.0 | 2.4 | 6.4 | 6.6 | 6.7 | 6.9 | 7.1 | 8.75 | 9.0 | 9.2 | 9.5 | 9.7 |
| China clay (Kaolin) | | | | | | | | | | | | 3.75 | 3.8 | 4.0 | 4.1 | 4.2 |
| Calcination Temperature, Degree Centigrade | 850 | 1,050 | 1,050 | 1,050 | 1,050 | 1,050 | 1,050 | 1,050 | 1,050 | 1,050 | 1,050 | 1,050 | 1,050 | 1,050 | 1,050 |

After the above constituents or ingredients were mixed and calcined in accordance with the procedures outlined in Examples I through VI, ceramic pigments were obtained which produced the characteristic pink coral hue in a glaze. Each pigment was calculated to have the composition as set forth in Table III, wherein each pigment is identified by the same example number used to designate the starting materials set forth in Table II. The oxide content of each raw mix or composition for each pigment is based on the assumptions that (1) All of the alkali metal salts are washed out,
(2) All of the halides or halogen compounds are removed by volatilization and/or washing,
(3) All of the silicon tetrafluoride ($SiF_4$) is removed by volatilization, and
(4) All sulfur oxides formed are removed by volatilization or washing.

Moreover where the fixed iron content exceeded 2 percent ferric oxide the unreacted zirconia and silica constituents comprised less than about 7 percent of the pigment.

In order to compare the pigments of the present invention with iron-containing zirconia-silica compositions of the prior art the following examples are set forth:

Example A

| Constituents: | Parts by weight |
|---|---|
| Zirconia ($ZrO_2$) | 500 |
| Ferric oxide ($Fe_2O_3$) | 50 |
| Flux | 92 |
|   Potassium feldspar, 35.82% | |
|   Sodium nitrate, 2.62% | |
|   Borax, 20.96% | |
|   Boric acid, 19.21% | |
|   Zinc oxide, 10.91% | |
|   Cryolite, 10.48% | |

The above constituents were intimately mixed and calcined at a temperature of about 950° C. for three hours. A light brown stain was obtained. When this stain was mixed with the above Cone 5 glaze composition in proportions of 10 parts stain to 90 parts glaze, and fired on

TABLE III

| Oxide Content Calculated for Raw Composition of Table II | VII | VIII | IX | X | XI | XII | XIII | XIV | XV | XVI | XVII | XVIII | XIX | XX | XXI |
|---|---|---|---|---|---|---|---|---|---|---|---|---|---|---|---|
| | Parts By Weight | | | | | | | | | | | | | | |
| Zirconia | 56.8 | 55.2 | 55.2 | 52.0 | 56.1 | 48.6 | 49.9 | 51.2 | 52.6 | 54.0 | 50.0 | 51.3 | 52.6 | 54.0 | 55.5 |
| Silica | 27.9 | 27.5 | 27.5 | 28.6 | 31.1 | 27.1 | 27.7 | 28.5 | 29.3 | 30.2 | 26.6 | 27.3 | 28.1 | 28.8 | 29.6 |
| Alumina | | 2.0 | 2.0 | 1.5 | 1.3 | 0.3 | 0.3 | 0.3 | 0.3 | 0.3 | 1.5 | 1.5 | 1.6 | 1.6 | 1.7 |
| Ferric Oxide | 2.6 | 9.2 | 9.2 | 9.3 | 4.7 | 12.8 | 10.5 | 8.1 | 5.6 | 2.9 | 12.5 | 10.3 | 7.9 | 5.4 | 2.8 |
| Titania | | | | 0.5 | 0.5 | 0.3 | 0.3 | 0.3 | 0.3 | 0.3 | | | | | |
| Iron Oxide Content of Calcined Pigments | Percent By Weight | | | | | | | | | | | | | | |
| Ferric Oxide (total calculated) | 3.0 | 9.8 | 9.8 | 10.1 | 5.2 | 14.4 | 11.8 | 9.2 | 6.4 | 3.3 | 13.8 | 11.4 | 8.8 | 6.0 | 3.1 |
| Ferric Oxide (total analyzed) | 3.4 | 9.4 | 9.6 | 9.7 | 4.85 | | | | | | | | | | |
| Fixed Ferric Oxide after acid leaching [1] analyzed | 1.0 | 1.5 | 0.6 | 2.15 | 1.08 | 2.7 | 2.5 | 2.0 | 1.4 | 1.0 | 2.86 | 2.6 | 2.2 | 1.9 | 1.6 |

[1] This amount of iron oxide is a measure of the iron oxide content in the zirconium silicate crystal lattice. The iron oxide was analyzed for each pigment after it had been boiled in 20% hydrochloric acid, using 100 grams of dry ground pigment per 200 milliliters of the acid.

ceramic tiles at 1130° C., the stain was destroyed and only an ivory colored glaze was obtained.

*Example B*

Repeating Example A by substituting cryolite for the flux, the same results were obtained. The light brown stain failed to produce significant color in the glaze demonstrating that the stain was destroyed.

*Example C*

When one-third of the zirconium oxide of Example A was replaced by silica in Example A, an ivory glaze was obtained using Opax as the source of zirconia and a light brownish glaze was obtained using pure zirconia. Neither of the glazes appeared to have a pink color.

The following Example D sets forth preparation of a pigment composition according to the process of the present invention deviating only slightly from the above Examples A through C.

*Example D*

Using zirconia, silica and ferric oxide, the procedure set forth in Example A was repeated except that cryolite was employed in place of the flux. With pure zirconia a rather weak dirty coral was produced in glaze and when Opax was used for the zirconia a clean, slightly weak coral was produced in glaze. In both instances the coral color imparted to the glaze was decidedly pink. The fact that a pink color was imparted to the glaze clearly shows this pigment to be different in kind from the pigments prepared in Examples A through C where absolutely no pink could be detected in a glaze containing the pigments of these examples. Moreover, by contrast, it appears that the borax and boric acid of the above flux are deleterious to the pigments of the present invention.

The ceramic colors or pigments of the present invention by themselves do not always appear to have a pinkish coral color, but when mixed with glazes act to produce a vitreous glazed surface on tile having a characteristic coral color which is definitely pink. Moreover in coloring glazes, the pigment is often referred to as a pink coral pigment even though the pigment itself may not be coral in color. Many times these pigments which do not appear to have a coral color impart a pinkish coral color to glazes. Moreover the pigments of the present invention have become known as a class to those skilled in the art and when referred to as coral pigments it is generally understood that the class is referred to rather than the color. The expression "coral pigments" has acquired a secondary meaning.

The pigments prepared according to my present invention may be used for coloring other ceramic materials, such as underglazes, vitreous enamels and may be used with various organic vehicles such as for example in the production of paints and the like.

While specific examples of the invention have been set forth hereinabove, it is not intended that the invention be limited solely thereto but to include all of the variations and modifications falling within the scope of the appended claims.

What is claimed is:

1. A coral pink ceramic pigment composition consisting essentially of from about 30 percent to about 80 percent by weight of oxide of zirconium, from about 15 percent to about 55 percent by weight of oxide of silicon and from about 0.25 percent to about 25 percent by weight of oxide of iron, associated together to the extent of at least about 40 percent of said oxides by weight in the form of an iron-containing zircon crystal lattice having at least about 0.25 percent by weight iron oxide contained in said lattice.

2. The pigment of claim 1 wherein at least about 80 percent by weight of said oxides are associated together in the form of an iron-containing zircon crystal lattice having from about 0.25 percent to about 6 percent iron oxide contained in said lattice.

3. A coral pink ceramic pigment composition consisting essentially of from about 30 percent to about 80 percent by weight of oxide of zirconium, from about 15 percent to about 55 percent by weight of oxide of silicon and from about 0.25 percent to about 25 percent by weight of oxide of iron, associated together to the extent of at least about 40 percent of said oxides by weight in the form of an iron-containing zircon crystal lattice having from about 0.25 percent to about 6 percent by weight iron oxide within said lattice.

4. The pigment of claim 3 wherein at least about 80 percent by weight of said oxides are associated together in the form of an iron-containing zircon crystal lattice having from about 0.5 percent to about 3 percent iron oxide contained in said lattice.

5. A coral pink ceramic pigment consisting essentially of from about 48 percent to about 70 percent by weight of oxide of zirconium, from about 24 percent to about 45 percent by weight of oxide of silicon, and from about 3 percent to about 15 percent by weight of oxide of iron, said oxides being associated together to the extent of at least about 40 percent by weight in the form of an iron-containing zirconia-silica crystal lattice having from about 0.25 percent to about 6 percent iron oxide contained in said lattice.

6. The pigment of claim 5 wherein at least about 80 percent by weight of said oxides is present in the form of an iron-containing zirconia-silica crystal lattice having from about 0.5 percent to about 3 percent iron oxide contained in said lattice.

7. As a new composition of matter a precalcination mixture containing compounds capable of yielding silica, zirconia, ferric oxide and fluoride ions upon calcination and wherein the proportions of such compounds are adjusted so as to yield on calcination a composition comprising from about 15 percent to about 55 percent by weight silica, from about 30 percent to about 80 percent by weight zirconia and from about 0.25 percent by weight to about 25 percent by weight ferric oxide and from about 0.25 percent to about 12 percent fluoride ions based on the combined weights of said silica, zirconia and iron oxide.

8. As a new composition of matter a calcination mixture which is suitable for the preparation of coral pink ceramic pigments by calcination consisting essentially of from about 15 percent by weight to about 55 percent by weight, expressed as $SiO_2$, of a silicon compound capable of yielding silicon oxide; from about 30 percent by weight to about 80 percent by weight, expressed as $ZrO_2$, of a zirconium compound capable of yielding zirconium oxide; from about 0.25 percent by weight to about 25 percent by weight, expressed as $Fe_2O_3$, of an iron compound capable of yielding $Fe_2O_3$; and a fluorine containing compound capable of yielding from about 0.25 percent by weight to about 12 percent by weight of fluoride ions.

9. The composition of matter of claim 8 wherein there is present a compound capable of yielding from about 0.25 percent by weight to about 8.0 percent by weight of alkali metal ions based on the combined weights of silica, zirconia and ferric oxide.

10. As a new composition of matter a calcination mixture which is suitable for the preparation of coral pink ceramic pigments by calcination consisting essentially of from about 15 percent by weight to about 55 percent by weight, expressed as $SiO_2$, of a silicon compound capable of yielding silicon oxide; from about 30 percent by weight to about 80 percent by weight, expressed as $ZrO_2$, of a zirconium compound capable of yielding zirconium oxide; from about 0.25 percent by weight to about 25 percent by weight, expressed as $Fe_2O_3$, of an iron compound capable of yielding $Fe_2O_3$; and mineralizer present in said calcination mixture in amounts such that from about 0.25 percent by weight to 12 percent by weight of fluoride ions are present, from about 0.25 percent by weight to about 8.0 percent by weight of alkali metal ions are present, and from about 0.25 percent by weight to about 8.0 percent by weight of halide ions selected from the group consisting of chloride ions and bromide ions are present.

11. A method of preparing an iron-zirconia stain comprising calcining at a temperature in the range of from about 700° C. to about 1300° C. an admixture containing compounds of zirconium capable of yielding zirconium oxide to the extent of from about 30 percent to about 80 percent by weight, compounds of silicon capable of yielding silicon oxide to the extent of from about 15 percent to about 55 percent by weight, compounds of iron capable of yielding iron oxide to the extent of from about 0.25 percent to about 25 percent by weight, and mineralizer capable of supplying alkali metal ions and fluoride ions.

12. The method of claim 11 wherein the compounds of iron capable of yielding iron oxide are water-soluble salts of iron.

13. A method of preparing an iron-zirconia stain comprising calcining at a temperature in the range of from about 800° C. to about 1100° C. an admixture containing compounds of zirconium capable of yielding zirconium oxide to the extent of from about 30 percent to about 80 percent by weight, compounds of silicon capable of yielding silicon oxide to the extent of from about 15 percent to about 55 percent by weight, compounds of iron capable of yielding iron oxide to the extent of from about 0.25 percent to about 25 percent by weight, a source of alkali metal ions, a source of fluoride ions, and mineralizer present comprising from 0.25 percent to 12 percent by weight of fluoride ion and from about 0.25 percent to about 8 percent of alkali metal ion.

14. The method of claim 13 wherein the compounds of iron capable of yielding iron oxide are water-soluble salts of iron.

References Cited by the Examiner
UNITED STATES PATENTS

| | | | |
|---|---|---|---|
| 1,719,432 | 7/29 | Kinzie | 106—48 |
| 2,441,447 | 5/48 | Seabright | 106—299 |
| 3,046,150 | 7/62 | Jamieson | 106—299 |

OTHER REFERENCES

Mellor: Comprehensive Treatise on Inorganic and Theoretical Chemistry, vol. 7, pages 98 and 99.

TOBIAS E. LEVOW, *Primary Examiner.*